(12) United States Patent
Madani (10) Patent No.: US 7,735,121 B2
(45) Date of Patent: Jun. 8, 2010

(54) VIRTUAL PAD

(76) Inventor: Masih Madani, 15385 Oxnard St., 2nd Floor, Van Nuys, CA (US) 91411

( * ) Notice: Subject to any disclaimer, the term of this patent is extended or adjusted under 35 U.S.C. 154(b) by 1437 days.

(21) Appl. No.: 10/337,537

(22) Filed: Jan. 7, 2003

(65) Prior Publication Data

US 2004/0133778 A1 Jul. 8, 2004

(51) Int. Cl.
*G06K 9/00* (2006.01)
*G06C 7/10* (2006.01)

(52) U.S. Cl. .................. 726/6; 726/30; 726/18; 713/168; 713/183; 713/184

(58) Field of Classification Search .......... 713/182, 713/183, 184, 168; 726/5, 16, 18, 6, 30
See application file for complete search history.

(56) References Cited

U.S. PATENT DOCUMENTS

| | | | | |
|---|---|---|---|---|
| 6,070,796 A * | 6/2000 | Sirbu | ...................... | 235/382 |
| 6,209,102 B1 * | 3/2001 | Hoover | ...................... | 726/18 |
| 6,209,104 B1 * | 3/2001 | Jalili | ...................... | 726/18 |
| 6,226,752 B1 * | 5/2001 | Gupta et al. | .................. | 726/9 |
| 6,317,835 B1 * | 11/2001 | Bilger et al. | ............... | 713/194 |
| 6,363,152 B1 * | 3/2002 | Cornelius et al. | ........... | 713/168 |
| 6,400,675 B1 | 6/2002 | Everidge et al. | | |
| 6,571,336 B1 * | 5/2003 | Smith, Jr. | ................... | 713/184 |
| 6,970,852 B1 | 11/2005 | Sendo et al. | | |
| 7,124,433 B2 * | 10/2006 | Little | ..................... | 713/182 |
| 7,387,240 B2 | 6/2008 | Ziegler | | |
| 7,526,652 B2 | 4/2009 | Ziegler | | |
| 2002/0188842 A1 | 12/2002 | Willeby | | |
| 2002/0188872 A1 | 12/2002 | Willeby | | |
| 2003/0002667 A1 * | 1/2003 | Gougeon et al. | ........... | 713/168 |
| 2003/0005290 A1 * | 1/2003 | Fishman et al. | ........... | 713/168 |
| 2003/0182558 A1 * | 9/2003 | Lazzaro et al. | ........... | 713/183 |
| 2004/0044739 A1 | 3/2004 | Ziegler | | |
| 2005/0055318 A1 | 3/2005 | Ziegler | | |

* cited by examiner

*Primary Examiner*—Jung Kim
*Assistant Examiner*—Izunna Okeke
(74) *Attorney, Agent, or Firm*—Christie, Parker & Hale, LLP (57) ABSTRACT

A system and method for communicating information over an insecure communications network include one or more computing devices that may access a first server via the communication network. In operation the first server displays an authentication Web page having a virtual pad with a plurality of characters that may be selected directly from a display of the computing device.

21 Claims, 6 Drawing Sheets

VIRTUAL PAD

BACKGROUND

This invention generally relates to systems and methods for facilitating communications over a public network and more particularly relates to systems and methods for securely communicating information over a public network.

Due to the development of the World Wide Web ("Web"), online communication over the Internet has experienced dramatic growth in recent years. For example, the Internet is used to conduct a broad range of commercial and financial transactions. Parties often use the communication capabilities of the Internet to enter into contracts or conduct business electronically and use electronic fund transfers (EFTs) to satisfy the resulting financial obligations. An EFT involves the movement of funds from one bank account to another in response to electronically-communicated payment instructions.

For example, an increasing number of merchants are developing websites that consumers may access and use to purchase goods and/or services. It is now common for a consumer to browse a merchant's online catalog, select a product, place an order for the product, and pay for the product all electronically over the Internet.

Although the Internet offers a fast, reliable, and efficient way to communicate and conduct business, information transmitted over the Internet or other global networks may be vulnerable to security breaches. For example, consumers typically pay for the goods and/or services ordered over the Internet with a credit card. During the online transaction, the merchant sends an order form and asks the consumer to enter personal data such as his name, address, and telephone number, and credit card information such as an account number and expiration date. The consumer returns the completed order form containing the credit card information to the merchant over the Internet.

Typically online merchants also direct the consumer to key in a personal identification number in a pop-up window to verify that the individual providing the credit card number is authorized to use the card. Therefore, in a typical online credit card transactions a keyboard reader installed on a computing device may be used to illicitly intercept the keystrokes used to enter the consumers PIN on the keyboard of the computing device. In addition, the credit card information may be intercepted in route and combined into a database with the PIN and used to make unauthorized purchases. In an automated environment, a thief can repeatedly use the stolen credit card information to readily conduct many online transactions before the consumer ever becomes aware that the credit card data has been stolen.

SUMMARY OF THE INVENTION

In one aspect of the present invention a method for transmitting information over a communication network includes connecting to the global network on a computing device, navigating to a first web site and presenting a virtual pad having a first plurality of characters that may be selected directly from a display of the computing device to enter information.

In another aspect of the present invention a system for communicating over a communication network includes a computing device and a first server that may be accessed by the computing device via the global network wherein the first server comprises means for presenting a virtual pad having a first plurality of characters that may be selected directly from a display of the computing device to enter information.

BRIEF DESCRIPTION OF THE DRAWINGS

The present invention will become better understood with regard to the following description, appended claims, and accompanying drawings, in which:

FIGS. 7(a-b) graphically illustrate the correlation between the actual characters displayed in the virtual pad (FIG. 7a) with an alternative character set (see FIG. 7b) that is transmitted across the global computer network in accordance with an exemplary embodiment of the present invention.

DETAILED DESCRIPTION OF THE INVENTION

An exemplary embodiment of the present invention provides a method and apparatus for securely communicating information over a communication network. The described exemplary embodiment provides a virtual pad comprising a plurality of alpha-numeric characters displayed on the screen of a computing device that a user may utilize to securely enter information such as for example a PIN. The information may then be securely communicated to remote devices through a remote communication network.

Figure 1:
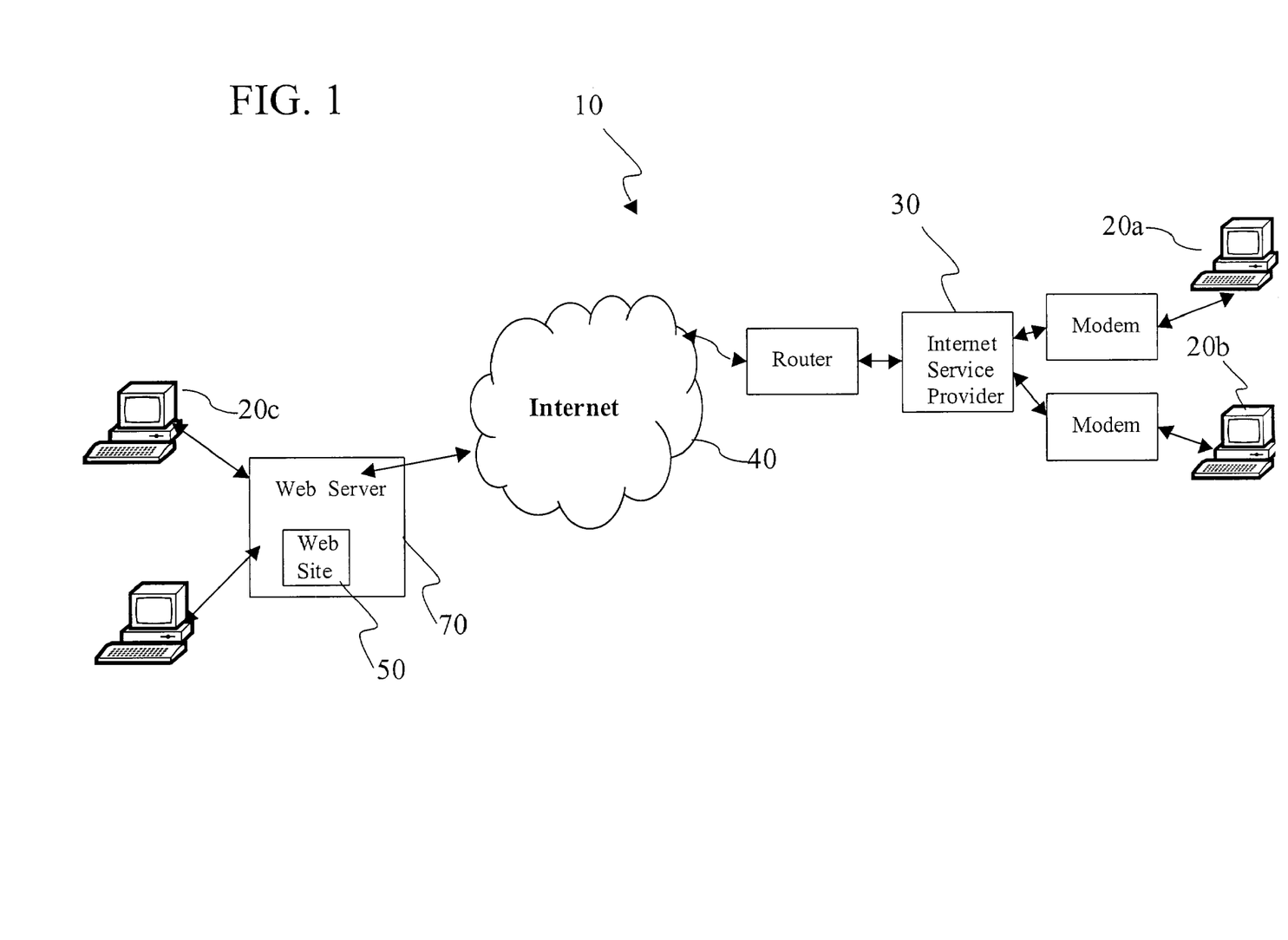
FIG. 1 is a simplified block diagram of a communication system including remote computing devices in accordance with an exemplary embodiment of the present invention.

For example, FIG. 1 illustrates an exemplary communications system 10 that may utilize the described exemplary virtual pad to provide secure communications over a remote communication network. The exemplary communication system 10 may comprise multiple remote computing devices 20a and 20b coupled to one or more web servers 70 through a remote communication network 40. The communication network may refer to a network or combination of networks spanning any geographical area, such as a local area network, wide area network, regional network, national network, and/or global network. The Internet is an example of a current global computer network. In addition, the communication network may be a hardwire network, wireless network, or a hybrid combination of hardwire and wireless networks.

Hardwire networks may include, for example, fiber optic lines, cable lines, ISDN lines, copper lines, etc. Wireless networks may include, for example, cellular systems, personal communications service (PCS) systems, satellite communication systems, packet radio systems, and mobile broadband systems. A cellular system may use any one of a variety of wireless technologies such as, for example, code division multiple access (CDMA), time division multiple access (TDMA), personal digital phone (PDC), Global System Mobile (GSM), or frequency division multiple access (FDMA), among others.

The remote computing devices 20a-20b may be general purpose computing devices that allow users to remotely communicate with the web server over the communication network 40. The computing devices may be any processor controlled device that permits access to the communication network, including terminal devices, such as personal computers, workstations, servers, clients, mini-computers, mainframe computers, laptop computers, a network of individual computers, mobile computers, palm-top computers, handheld computers, set top boxes for a television, other types of web enabled televisions, interactive kiosks, personal digital assistants, interactive or web enabled wireless communications devices, mobile web browsers, or a combination thereof.

The computers may comprise one or more input devices such as a keyboard, mouse, touch pad, joystick, pen input pad, and the like. The computers may also possess an output device, such as a visual display and an audio output. One or more of these computing devices may form a computing environment.

An exemplary web server 70 preferably hosts a website 50 comprising one or more interrelated web page files and other files and programs. The files and programs may be accessed via the communications network 40. For example, in one embodiment the communication network may comprise the Internet and the remote devices may communicate with the web server by sending for example, a hypertext transfer protocol (HTTP) request specifying a uniform resource locator (URL) that identifies the location of one of the web page files, wherein the files and programs are owned, managed or authorized by a single entity. Such files and programs can include, for example, hypertext markup language (HTML) files, common gateway interface (CGI) files, Java applications or the like.

In an exemplary embodiment, the web page files may include a home page file that corresponds to a home page of the website. The home page can serve as a gateway or access point to the remaining files and programs contained within the website. In one embodiment, all of the files and programs may be located under, and accessible within, the same network domain as the home page file. Alternatively, the files and programs can be located and accessible through several different network domains.

Figure 2:
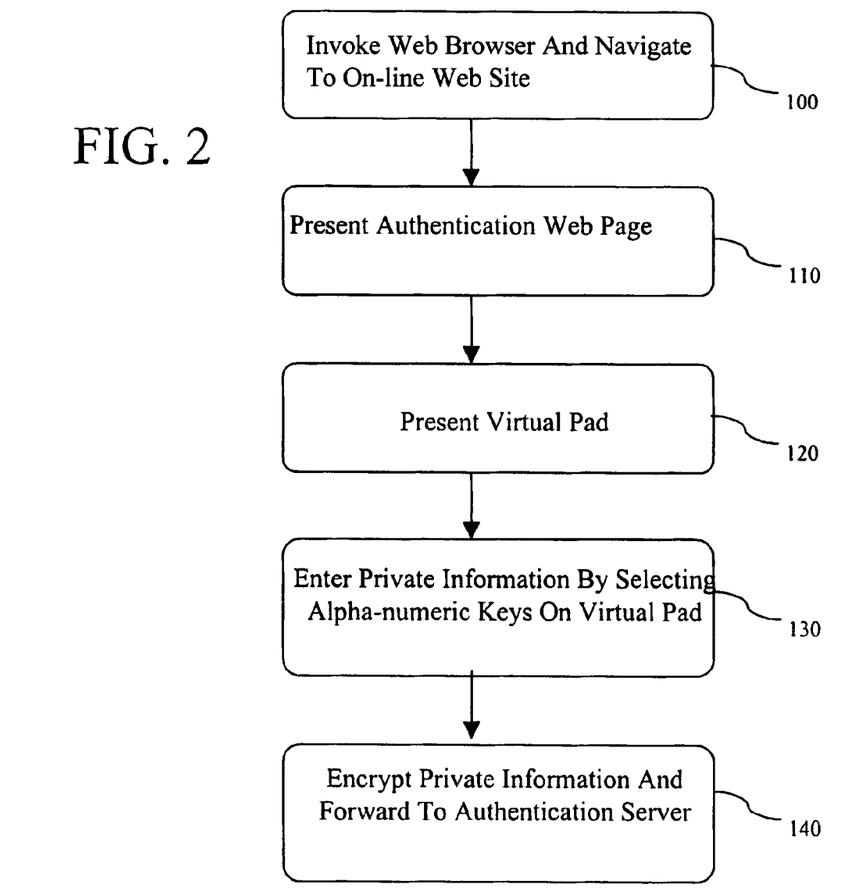
FIG. 2 is a graphical illustration of an exemplary process for utilizing a virtual pad to provide secure communication over an insecure global network in accordance with an exemplary embodiment of the present invention.

FIG. 2 graphically illustrates an exemplary process for utilizing a virtual pad to provide secure communication over an insecure communication network. In the described exemplary embodiment a user may initiate a secure communication with a remote device by invoking a web browser on a remote communication device and navigating to an online web site 100. For example, in one embodiment, a user may navigate to a website to purchase a particular product or service or to remotely log-on to a secure private network.

In operation, an exemplary online web site may include an authentication Web page 110 or may redirect the user to an authentication server that may for example, verify the user's payment method in the context of an on-line commercial transaction or verify the user's authorization to access a remote secure communication network. In one embodiment the authentication server may include one or more authentication Web pages that the user may fill-in to complete a secure on-line communication package. For example, the authentication server may present web pages created with hyper text markup language ("HTML") which request certain personal and financial information, such as the user's name, address, telephone number, social security number, income, presently owned credit cards, bank affiliations, and the like.

In the described exemplary embodiment the authentication server may also include a Web page comprising a virtual pad from which the user may enter private information 120. In one embodiment the virtual pad may comprise a plurality of alpha-numeric keys which may be directly selected from the display of the user's remote computing device using a mouse or other similar input devices 130. Therefore, the user may enter private information such as, for example, a social security number, a PIN number associated with a credit card or a password without using the keyboard whose keystrokes may be monitored by unauthorized parties. In an exemplary embodiment, the private information may be encrypted and communicated to the authentication server. The authentication server may then verify the entered information and complete the on-line transaction for a valid information.

Figure 3:
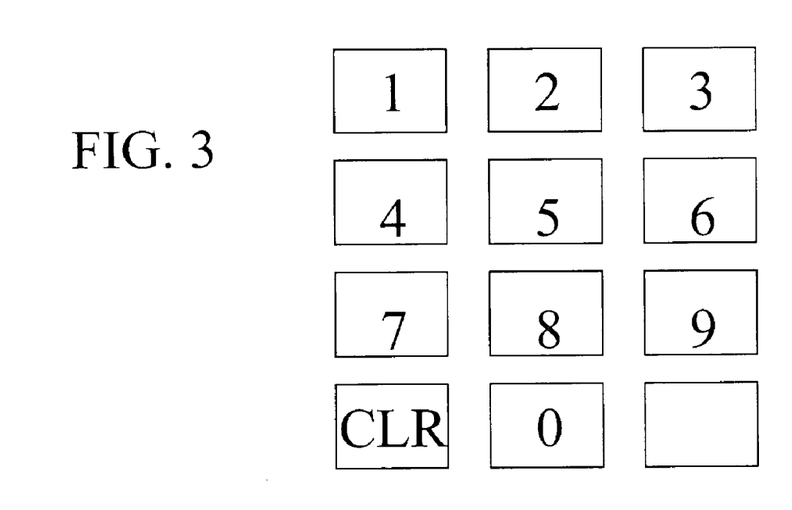
FIGS. 3-6 are graphical illustrations demonstrating the random location of characters in different locations in the virtual pad in accordance with an exemplary embodiment of the present invention.
Figure 4:
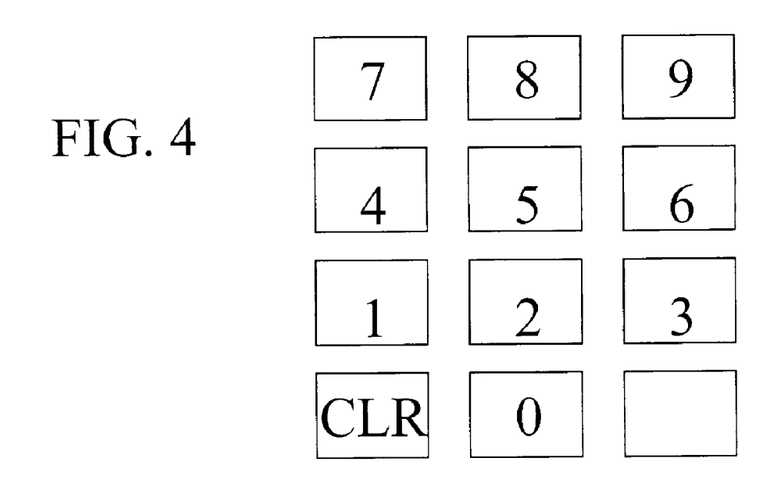
Figure 5:
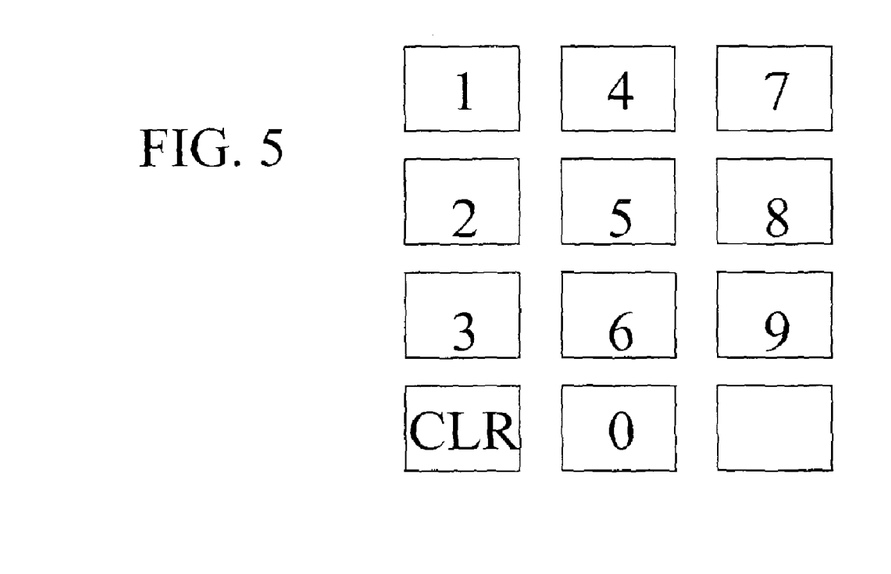
Figure 6:
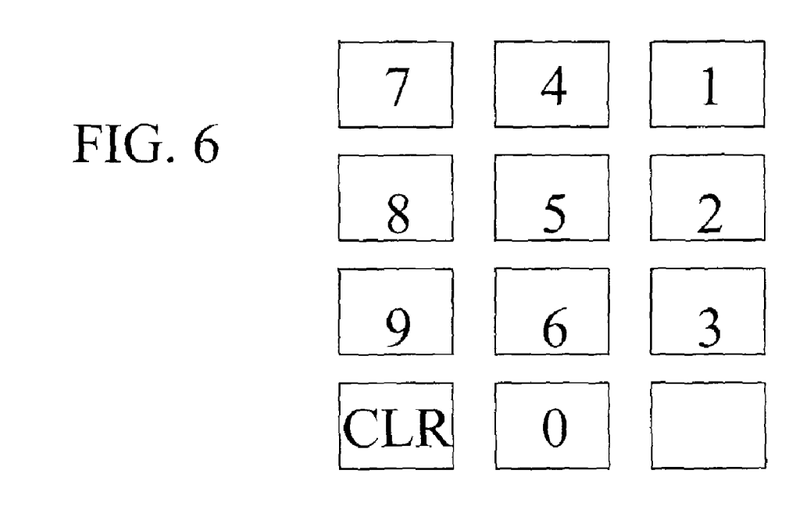

Referring to the screen capture illustrated in FIG. 3, the described virtual pad may comprise a plurality of numeric, alphabetical or alphanumeric characters. In an exemplary embodiment the user may select the appropriate virtual pad keys with an input device such as a wand for touch sensitive display screens, a light pen, a mouse or the like. Referring back to FIG. 2, in an exemplary embodiment, the user's private information input through the virtual pad may be encrypted and forwarded to the authentication server via a secure session.

One of skill in the art will appreciate that there are a variety of ways to encrypt data streams ranging from those that provide highly secure packets to those that provide a basic level of encryption. Determining the best way to encrypt the streams usually involves a trade-off between level of security and computational expense. Often, the more secure the encryption, the more complex the mathematical algorithm and the more processing power (and added latency as a result) required to encrypt the packet.

For example, in an exemplary embodiment, transmission of data may be made using secure socket layer (SSL) protocols and standard 128 bit encryption technology. SSL protocol is an optional layer that fits between the transmission control protocol (TCP) layer and the hypertext transfer protocol (HTTP) layer. The SSL protocol verifies the identity of the parties involved in a secure transaction and ensures that data transmission is protected from tampering or interception. As is known in the art, SSL protocol supports a plurality of cryptographic algorithms. It is assumed however that 128 bit data encryption may be utilized for secure sessions. One of skill in the art will appreciate however that the present invention is not limited to a particular security protocol or encryption technique.

Rather, it is expected that secure-data-transmission protocols and encryption technology will continue to improve and that future developments in these technologies will be applicable to the communication of information entered via the virtual pad of the present invention. In addition, higher levels of encryption may also be used to provide greater security without affecting the operation of the present invention. In an exemplary embodiment the authentication server may decrypt the received information and validate the private information to complete the communication as appropriate for a particular interaction.

In practice, a screen reader to illicitly intercept the entry of information via the described exemplary virtual pad would be more costly and less successful than a keyboard reader. For example, an unauthorized user would have to correlate the location (i.e. screen coordinates) selected on the display of the computing device with the alphanumeric character entered by the user to illicitly intercept the information being entered through the described exemplary virtual pad.

Therefore, to further reduce the risk of illicit interception of private information, an exemplary authentication server may randomly display the alpha-numeric characters in different locations in the virtual pad as illustrated in FIGS. 3-6. In addition, an exemplary system may also randomize the location where the virtual pad is displayed on the authentication Web page to further secure the entry of private information against illicit monitoring.

Figure 7A:
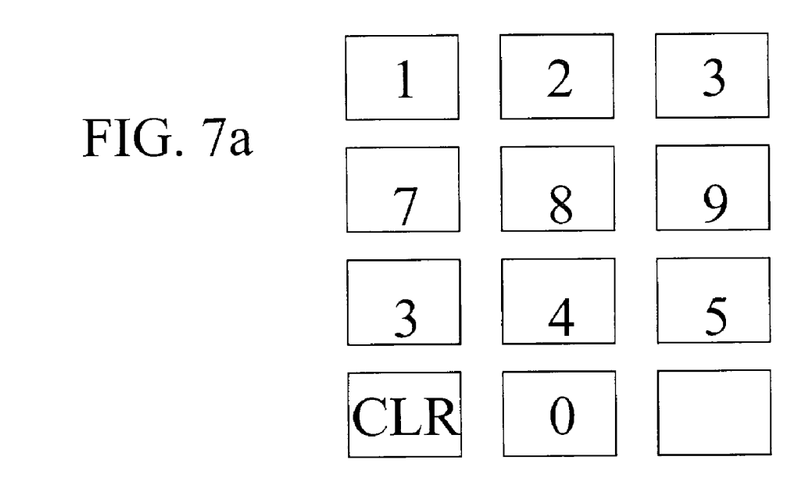
Figure 7B:
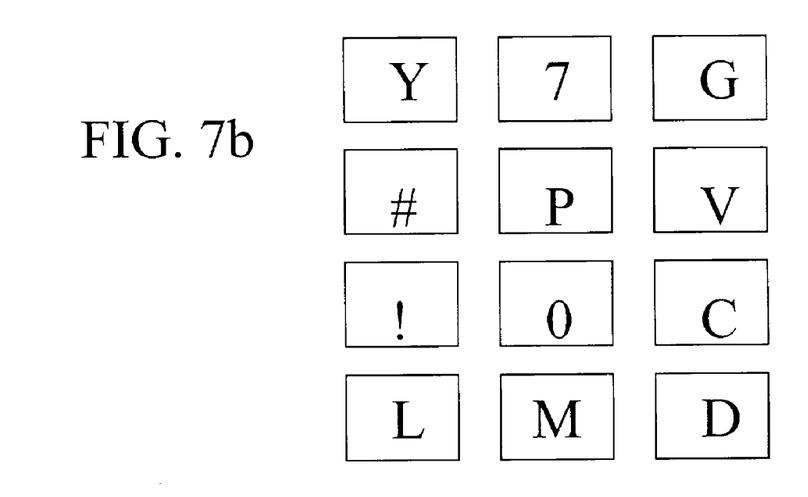

Referring to FIG. 7, an exemplary system may also correlate the actual characters displayed in the virtual pad (FIG. 7*a*) with an alternative character set (see FIG. 7*b*) stored in a database on the authentication server. The characters from the alternative character set that corresponds to the private information being entered by the user may then be encrypted and communicated to the authentication server. For example, if a user's PIN number is numeric characters "123" the associated characters "Y7G" would be encrypted and transmitted to the authentication server. In the described exemplary embodiment the authentication server decrypts the received PIN number and correlates the received character string "Y7G" with the actual information entered by the user "123". The authentication server may then validate the user's PIN number as required to complete the interaction.

In this embodiment, the authentication server presents the virtual pad on a virtual pad Web page and is the only party aware of the correlation between the characters displayed on the virtual pad and the alternative character set. Therefore, a third party who illicitly intercepted the information entered on the virtual pad would not would not know the corresponding characters in the alternative character set and therefore would not be able to use the information to conduct unauthorized transactions or communications. Rather the third party would communicate the actual information entered by the user via the virtual pad which when translated by the authentication server would correspond to an invalid password, PIN number or the like.

The advantages of the present invention may best be illustrated in the context of an exemplary secure communication. For example, referring to FIG. 8, in a commercial transaction a consumer may initiate an online commercial transaction by invoking his Web browser and navigating to an online merchant's web site to purchase a particular product or service 200. In an exemplary embodiment the merchant's Web site may establish a secure link between the Web site and the consumer 210. In operation many online merchant Web sites include shopping carts and associated order forms displayed in the form of Web pages that a consumer may complete to purchase selected items. Often the online order form may include a payment section where the consumer may indicate a desire to pay for the purchase with a credit card.

Figure 8:
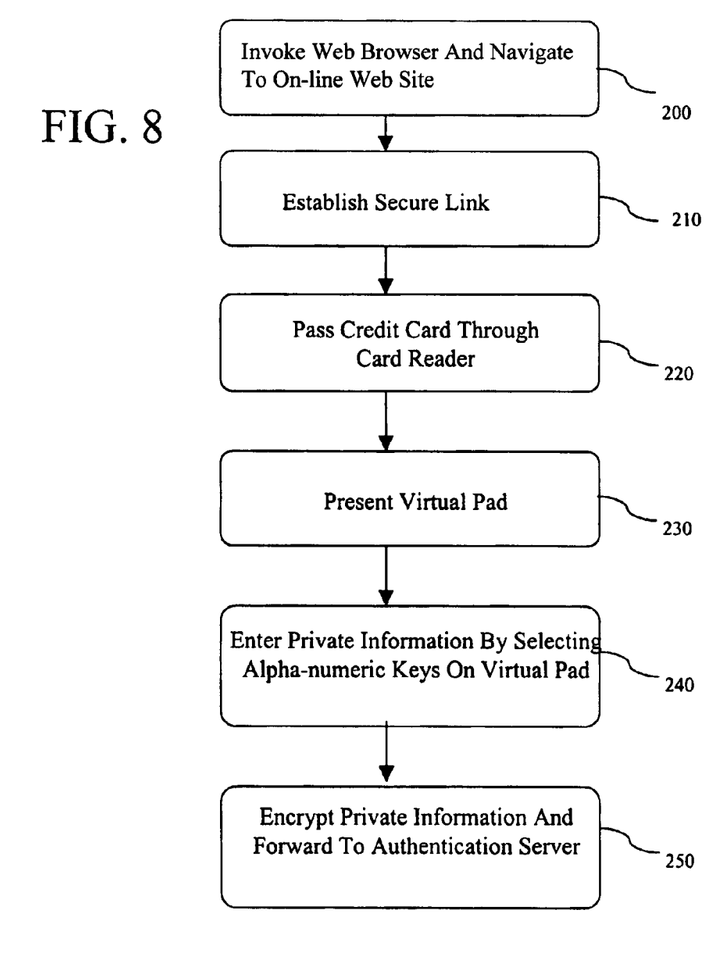
FIG. 8 is a graphical illustration of an exemplary process for utilizing a virtual pad to provide secure communication over an insecure global network in a commercial transaction using a credit card and a card reader, in accordance with an exemplary embodiment of the present invention.

In accordance with an exemplary embodiment the merchant's Web site may prompt the consumer to pass his credit card through a card reader coupled to the consumer's computer 220. An authentication Web page may display a virtual pad prompting the consumer to enter a credit card PIN number 240 via the virtual pad. In an exemplary embodiment, the consumer's credit card number and PIN number may be encrypted and forwarded to the merchant's Web site where it is decrypted and verified 240. In one embodiment the merchant rejects the transaction if the PIN number is not verified.

Alternatively, the merchant may redirect the consumer to an authentication server that establishes a secure link with the consumer's computing device. In this embodiment the authentication server prompts the consumer to enter his credit card number via a displayed virtual pad. The authentication server may then prompt the consumer to enter a PIN number via a virtual pad displayed on the authentication web page. In an exemplary embodiment, the consumer's credit card number and PIN number may be encrypted and forwarded to the authentication server where it is decrypted and verified. In one embodiment the authentication server rejects the transaction if the PIN number is not verified.

To those skilled in the various arts, the invention itself herein will suggest solutions to other tasks and adaptations for other applications. It is applicant intention to cover by claims all such uses of the invention and those changes and modifications which could be made to the embodiments of the invention herein chosen for the purpose of disclosure without departing from the spirit and scope of the invention.

What is claimed is:

1. A method for transmitting information over a communication network, comprising:

navigating to a first web site on the communication network from a computing device;

presenting a virtual pad generated by a server, the virtual pad comprising a first plurality of characters on a Web page that may be selected directly from a display of the computing device to enter information; and generating a second plurality of characters utilizing an alternative character set stored in a database on the server and differing from that of the first plurality of characters, wherein each character of the first plurality of characters corresponds to one character in the alternative character set, and wherein information corresponding to the first plurality of characters entered using the virtual pad is converted to corresponding characters in the alternative character set prior to transmission.

2. The method of claim 1 further comprising encrypting information entered via the virtual pad and communicating the encrypted information to said first web site.

3. The method of claim 1 further comprising encrypting information entered via the virtual pad and communicating the encrypted information to a second web site.

4. The method of claim 1 wherein presenting the virtual pad on the display of the computing device comprises randomly locating the first plurality of characters in the virtual pad.

5. The method of claim 1 wherein presenting the virtual pad on the display of the computing device comprises randomly locating the entire virtual pad at different areas of the display of the computing device.

6. The method of claim 2 wherein the information entered via the virtual pad comprises a PIN number.

7. The method of claim 6 wherein the information entered via the virtual pad further comprises a credit card number.

8. The method of claim 2 wherein the information entered via the virtual pad comprises a password.

9. The method of claim 2 wherein the information entered via the virtual pad comprises a social security number.

10. A method for transmitting information over a communication network, comprising:

presenting a virtual pad generated by a server, the virtual pad comprising a first plurality of characters on a Web page accessible over the communication network, wherein the first plurality of characters are selectable directly from a display of a computing device coupled to the communication network to enter information; and generating a second plurality of characters utilizing an alternative character set stored in a database on the server and differing from that of the first plurality of characters, wherein each character of the first plurality of characters corresponds to one character in the alternative character set, and wherein information corresponding to the first plurality of characters entered using the virtual pad is converted to corresponding characters in the alternative character set prior to transmission over the communication network.

11. The method of claim 10 wherein presenting the virtual pad on the display of the computing device comprises randomly locating the first plurality of characters in the virtual pad.

12. The method of claim 10 wherein presenting the virtual pad on the display of the computing device comprises randomly locating the entire virtual pad at different areas of the display of the computing device.

13. A method for transmitting information over a communication network, comprising:

presenting a virtual pad generated by a server, the virtual pad comprising a first plurality of characters on a Web page accessible over the communication network, wherein the first plurality of characters are selectable directly from a display of a computing device coupled to the communication network to enter information; and generating a second plurality of characters utilizing an alternative character set stored in a database on the server and differing from that of the first plurality of characters, wherein each character of the first plurality of characters corresponds to one and only one character in the alternative character set, and wherein information corresponding to the first plurality of characters entered using the virtual pad is converted to the one and only one character in the alternative character set prior to transmission over the communication network.

14. The method of claim 13 further comprising encrypting information entered via the virtual pad and communicating the encrypted information to said first Web site.

15. The method of claim 14 wherein the information entered via the virtual pad comprises a password.

16. The method of claim 14 wherein the information entered via the virtual pad comprises a social security number.

17. The method of claim 14 wherein the information entered via the virtual pad comprises a PIN number.

18. The method of claim 17 wherein the information entered via the virtual pad further comprises a credit card number.

19. The method of claim 13 further comprising encrypting information entered via the virtual pad and communicating the encrypted information to a second Web site.

20. The method of claim 13 wherein presenting the virtual pad comprises randomly locating the first plurality of characters in the virtual pad.

21. The method of claim 13 wherein presenting the virtual pad comprises randomly locating the entire virtual pad at different areas of the display of the computing device.

* * * * *